(12) United States Patent
Hjelm et al.

(10) Patent No.: US 9,374,710 B2
(45) Date of Patent: Jun. 21, 2016

(54) MEDIATION SERVER, CONTROL METHOD THEREFOR, COMMUNICATION DEVICE, CONTROL METHOD THEREFOR, COMMUNICATION SYSTEM, AND COMPUTER PROGRAM

(75) Inventors: Johan Hjelm, Tokyo (JP); Heiko Perkuhn, Bonn (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 242 days.

(21) Appl. No.: 13/817,014

(22) PCT Filed: Aug. 16, 2010

(86) PCT No.: PCT/JP2010/064124
§ 371 (c)(1),
(2), (4) Date: Feb. 14, 2013

(87) PCT Pub. No.: WO2012/023213
PCT Pub. Date: Feb. 23, 2012

(65) Prior Publication Data
US 2013/0143524 A1    Jun. 6, 2013

(51) Int. Cl.
H04W 12/08    (2009.01)
H04W 8/20    (2009.01)
H04W 4/00    (2009.01)
H04W 24/08    (2009.01)

(52) U.S. Cl.
CPC .............. *H04W 12/08* (2013.01); *H04W 4/005* (2013.01); *H04W 8/205* (2013.01); *G06F 2213/0038* (2013.01); *H04W 24/08* (2013.01)

(58) Field of Classification Search
CPC ...... H04W 12/08; H04W 8/205; H04W 4/005
USPC ............ 455/410, 556.1–2, 557, 558; 705/16, 705/17, 21, 44
See application file for complete search history.

(56) References Cited

U.S. PATENT DOCUMENTS

| | | | |
|---|---|---|---|
| 7,024,395 B1 * | 4/2006 | McCown et al. | 705/65 |
| 2001/0047330 A1 * | 11/2001 | Gephart et al. | 705/39 |
| 2004/0124246 A1 * | 7/2004 | Allen et al. | 235/492 |
| 2005/0227692 A1 | 10/2005 | Kawashima et al. | |
| 2008/0051062 A1 * | 2/2008 | Lee | 455/411 |

(Continued)

FOREIGN PATENT DOCUMENTS

| | | |
|---|---|---|
| EP | 1467585 A2 | 10/2004 |
| JP | 9074584 A | 3/1997 |

(Continued)

*Primary Examiner* — Cong Tran
(74) *Attorney, Agent, or Firm* — Rothwell, Figg, Ernst & Manbeck, P.C.

(57) ABSTRACT

A mediation server which is able to communicate with a plurality of account managing servers (104) and mediates requests for issuing subscription information transmitted from a plurality of communication devices between each communication device and any one of the plurality of account managing servers (104), the mediation server comprising, a selection unit configured to select the account managing server to which the request is to be transmitted based on information regarding a current operational status of each account managing server stored in a database, when the request is received from the communication device, and a transmission unit configured to transmit the request for issuing the subscription information to the selected account managing server.

17 Claims, 8 Drawing Sheets

(56) References Cited

U.S. PATENT DOCUMENTS

| | | | | |
|---|---|---|---|---|
| 2009/0030844 | A1* | 1/2009 | Hoffman et al. | 705/67 |
| 2009/0192904 | A1* | 7/2009 | Patterson | G06Q 20/20 705/17 |
| 2010/0291895 | A1* | 11/2010 | Drzyzga | G06Q 20/32 455/410 |
| 2011/0296182 | A1* | 12/2011 | Jia et al. | 713/168 |
| 2013/0221092 | A1* | 8/2013 | Kushevsky | G06Q 20/3672 235/379 |
| 2014/0098671 | A1* | 4/2014 | Raleigh | H04M 15/80 370/235 |
| 2014/0136309 | A1* | 5/2014 | Goldman | G06Q 30/0226 705/14.27 |

FOREIGN PATENT DOCUMENTS

| | | |
|---|---|---|
| JP | 2002290624 A | 10/2002 |
| JP | 2010154109 A | 7/2010 |

* cited by examiner

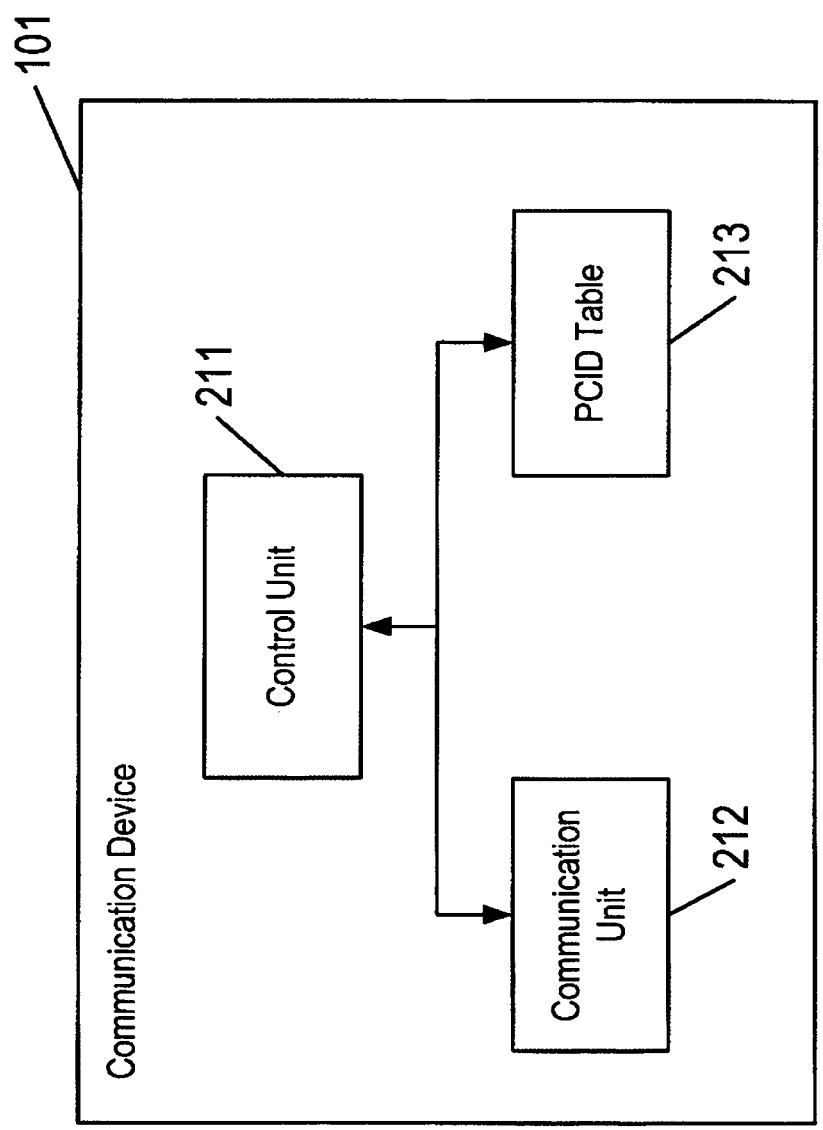

FIG. 3

| ID | T1 | T2 |
|---|---|---|
| SH01 | 12:32:01 | 12:32:30 |
| SH02 | 12:40:00 | 12:42:30 |
| SH03 | 12:45:00 | 12:46:30 |
| . | . | . |
| . | . | . |
| . | . | . |
| . | . | . |

FIG. 5

| ID | Busy period |
|---|---|
| SHO1 | AM7:00-AM9:00 |
| SHO2 | PM2:00-PM5:00 |
| SHO3 | PM6:30-PM9:30 |
| . | . |
| . | . |
| . | . |
| . | . |

MEDIATION SERVER, CONTROL METHOD THEREFOR, COMMUNICATION DEVICE, CONTROL METHOD THEREFOR, COMMUNICATION SYSTEM, AND COMPUTER PROGRAM

CROSS-REFERENCE TO RELATED APPLICATION

This application is a 35 U.S.C. §371 National Phase Entry Application from PCT/JP2010/064124, filed Aug. 16, 2010, and designating the United States.

TECHNICAL FIELD

The present invention generally relates to a mediation server, a control method therefor, a communication device, a control method therefor, a communications system and a computer program.

BACKGROUND

The use of downloadable USIM to establish the credentials of users and terminals is well known, and described in the 3GPP TR 33.812 V9.2.0. TR 33.812 V9.2.0 discusses remote provisioning of subscriptions for Machine-to-Machine Equipment (M2ME). According to TR 33.812, M2ME, which is a kind of a communication device, is provided with a temporary private identifier called a Provisional Connectivity ID (PCID). The PCID follows the same format as an International Mobile Subscriber Identity (IMSI), and a network operator identified by the PCID is called a Registration Operator (RO). The M2ME accesses the RO using the PCID, and requests subscription information called a Machine Communication Identity Module (MCIM). Upon request, the RO accesses another network operator called a Selected Home Operator (SHO), receives the MCIM issued by the SHO, and forwards the MCIM to the M2ME.

In TR 33.812 V9.2.0, it is also described how a terminal can initially attach to a network using 3GPP radio technologies, receive an initial authentication and authorization for a limited set of operations from the provider of the network to which the terminal is connected, and use this limited authorization to trigger the authentication and authorization of a connection to a provider of shared secrets, authorization certificates, and services which are attached to the subscription of the user of the terminal, and download these into a secure area of the terminal, so that the shared secret and authentication certificates can be used to authenticate and authorize the terminals as being used under the subscription in question towards the network to which it is attached.

TR 33.812 describes several variations of the technology, which serve to enhance security, operability, and other factors. These include methods which leverage the presence of a UICC, as well as those which do not assume that such an entity is present.

TR 33.812 describes in general terms a mechanism by which a previously established credential can be used to authorize the establishment of a connection through a visited operator with the home operator of the subscriber, and there is an implicit assumption that there would only be one of each actor. However, this is not reflected in realistic scenarios, wherein a terminal will discover multiple radio networks, and attempt to authenticate itself with one of them. Since the network also broadcasts its identification, this network can be pre-selected, i.e. the terminal, by preference, addresses the authentication request to one network, for instance one which the home operator of the subscriber has a commercial relation with.

When there is no preference for the visited network, however, the terminal will attempt to establish a connection with the network whose radio signals have the highest signal strength. While this situation may be highly applicable in rural settings, it is increasingly such that in cities, there are a number of mobile networks of equal signal strength. Hence, this criterion does not function well.

In such situations, a terminal acting in the scenario described in TR 33.812 will select a network connection at random. This can be leveraged to address another concern, that of the network operator of the network being flooded by connection requests from a very large number of terminals at the same time enacting the scenarios in TR 33.812. This could be the case, for example, when a service provider has decided to change the SHO for a fleet of power meters. All M2MEs would be receiving Bootstrap requests simultaneously and thus all would try to connect to the RO in the same instant.

SUMMARY

The present invention is intended to address the above-described problem, and it is a feature of the present invention to introduce an improved technology for providing a communication device with subscription information via a network.

Note that "subscription information" is also referred to as the MCIM in the present application.

According to the first aspect of the present invention, there is provided a mediation server which is able to communicate with a plurality of account managing servers and mediates requests for issuing subscription information transmitted from a plurality of communication devices between each communication device and any one of the plurality of account managing servers, the mediation server comprising, a selection unit configured to select the account managing server to which the request is to be transmitted based on information regarding a current operational status of each account managing server stored in a database, when the request is received from the communication device, and a transmission unit configured to transmit the request for issuing the subscription information to the selected account managing server.

According to the second aspect of the present invention, there is provided a communication device which is able to request an issuance of subscription information to one of a plurality of account managing servers via a mediation server according to the first aspect of the present invention, the communication device comprising, a storage unit configured to store at least two items of identification information each having a different priority, and a communication unit configured to transmit the request of the issuance of the subscription information to the mediation server, wherein the communication unit is further configured to transmit the request with the identification information of a lower priority until the request is sequentially rejected a predetermined number of times, and after the request is sequentially rejected the predetermined number of times, to transmit the request with the identification information of a higher priority.

According to the third aspect of the present invention, there is provided a communication system comprising a plurality of account managing servers and a mediation server which is able to communicate with a plurality of account managing servers and mediates requests for issuing subscription information transmitted from a plurality of communication devices between each communication device and any one of the plurality of account managing servers, wherein the mediation server comprising, a selection unit configured to select the account managing server to which the request is to be transmitted based on information regarding a current operational status of each account managing server stored in a database, when the request is received from the communication device, and a transmission unit configured to transmit the request for issuing the subscription information to the selected account managing server, the selected account managing server which receives the request from the mediation server issues the subscription information and transmits the subscription information to the mediation server, and the mediation server transmits the subscription information to the communication device.

According to the fourth aspect of the present invention, there is provided a control method of a mediation server which is able to communicate with a plurality of account managing servers and mediates requests for issuing subscription information transmitted from a plurality of communication devices between each communication device and any one of the plurality of account managing servers, the method comprising steps of, selecting the account managing server to which the request is to be transmitted based on information regarding a current operational status of each account managing server stored in a database, when the request is received from the communication device, and transmitting the request for issuing the subscription information to the selected account managing server.

According to the fifth aspect of the present invention, there is provided a control method of a communication device which is able to request an issuance of subscription information to one of a plurality of account managing servers via a mediation server according to the first aspect of the present invention, the communication device comprising a storage unit configured to store at least two identification information each having a different priority, the method comprising steps of, transmitting the request of the issuance of the subscription information to the mediation server, with the identification information of a lower priority until the request is sequentially rejected a predetermined number of times, and after the request is sequentially rejected the predetermined number of times, transmitting the request with the identification information of a higher priority.

According to the sixth aspect of the present invention, there is provided a computer program which causes a computer to execute a control method of a mediation server which is able to communicate with a plurality of account managing servers and mediates requests for issuing subscription information transmitted from a plurality of communication devices between each communication device and any one of the plurality of account managing servers, the method comprising steps of, selecting the account managing server to which the request is to be transmitted based on information regarding a current operational status of each account managing server stored in a database, when the request is received from the communication device, and transmitting the request for issuing the subscription information to the selected account managing server.

According to the seventh aspect of the present invention, there is provided a computer program which causes a computer to execute a communication device which is able to request an issuance of subscription information to one of a plurality of account managing servers via a mediation server according to the first aspect of the present invention, the communication device comprising a storage unit configured to store at least two identification information each having a different priority, the method comprising steps of, transmitting the request of the issuance of the subscription informa-tion to the mediation server, with the identification information of a lower priority until the request is sequentially rejected a predetermined number of times, and after the request is sequentially rejected the predetermined number of times, transmitting the request with the identification information of a higher priority.

Further features of the present invention will become apparent from the following description of exemplary embodiments with reference to the attached drawings, in which like reference characters designate the same or similar parts throughout the figures thereof.

BRIEF DESCRIPTION OF DRAWINGS

FIG. 2B is a functional block diagram of the communication device 101;

FIG. 3 is an example of data table stored in the connection DB 206;

FIG. 5 is another example of data table stored in the connection DB 206;

DETAILED DESCRIPTION

Figure 1:
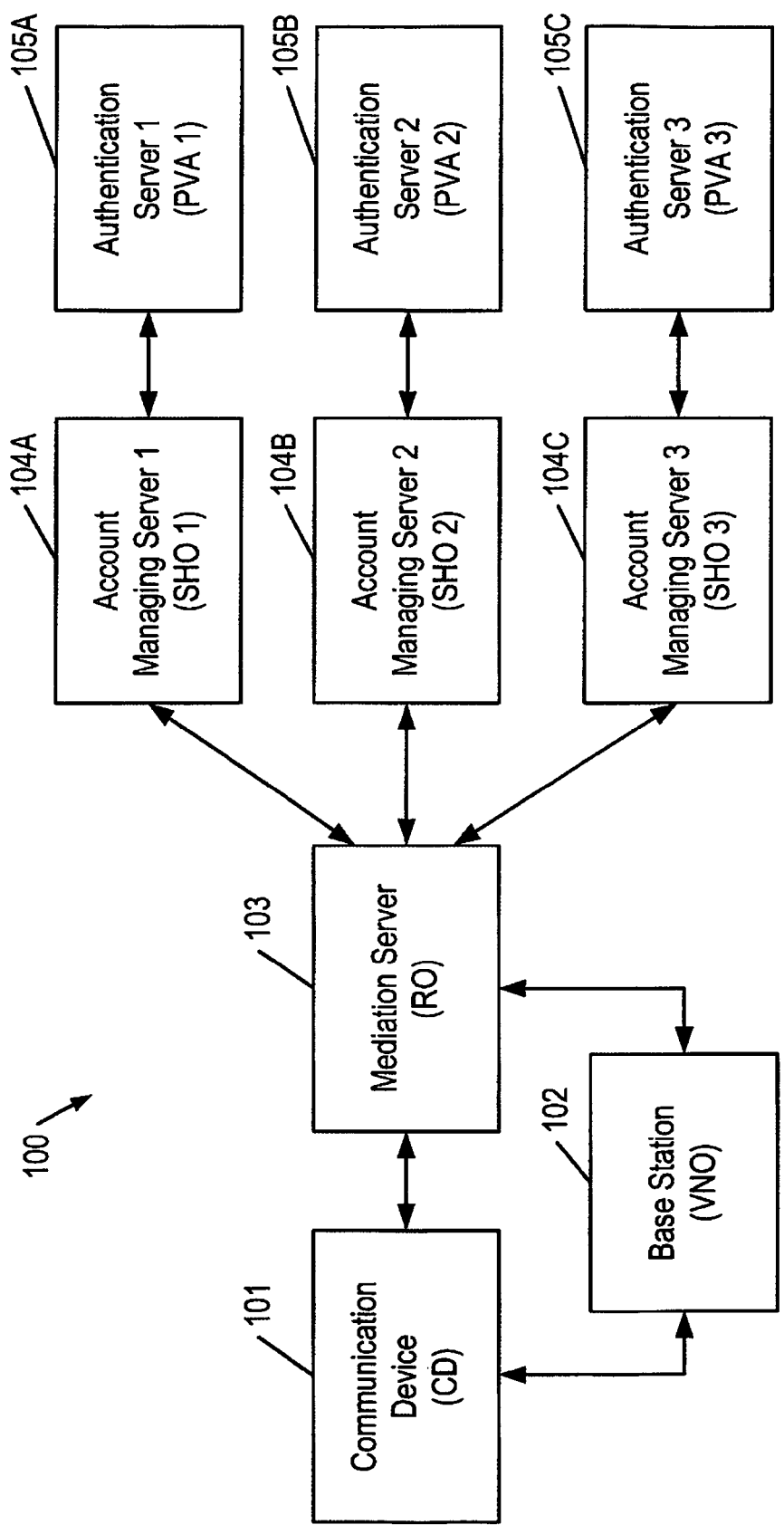
FIG. 1 illustrates an overview of a provisioning system 100 according to one aspect of embodiments of the present invention.

FIG. 1 illustrates an overview of a provisioning system 100 according to the first embodiment of the present invention. In FIG. 1, communication device 101 is a device for communicating with a visited network operator (VNO) 102 and a mediation server 103 as a registration operator (RO), and contains a Provisional Connectivity ID (PCID). Examples of the communication device 101 include a mobile terminal, a digital photo frame, and a monitoring sensor. Because the PCID identifies the communication device 101, the PCID can be used as device identification information for identifying the communication device 101. The communication device 101 is intended to obtain a Machine Communication Identity Module (MCIM) of a Selected Home Operator (SHO) as subscription information. Although the communication device 101 corresponds to Machine-to-Machine equipment (M2ME) described in TR 33.812, the term "communication device" is used in place of the term "M2ME" because the communication performed by the communication device 101 is not limited to machine-to-machine communication.

The communication device 101 comprises a control unit 211, a communication unit 212 and a PCID table. It should be noted that the functionality of each block in the communication device 101 may be implemented using dedicated hardware, using software executed by a processor (not shown), or a combination thereof.

A base station 102 provides temporary 3GPP network access to the communication device 101, where authentication using credentials such as a PCID may be required. Although the base station 102 is illustrated as a single node, the functions of the mediation server 103 may be separated into two or more nodes. The base station is operated by visited network operator (VNO). The base station 102 supports the following functions.

Provide temporary 3GPP network access to the communication device 101, where authentication using credentials such as a PCID may be required. The base station may provide full or restricted connectivity during initial access.

Provide open network access to the Discovery and Registration Function (DRF) when possible, i.e., where no credentials or authentication are required for this access. This function applies when the VNO will become the SHO after registration and provisioning, for example.

Provide connectivity to the SHO, when the SHO and the VNO are distinct operators.

The mediation server 103 is a server for providing the communication device 101 with the MCIM of any one of the SHO 1 to SHO3. The purpose of the mediation server 103 is to provide initial connectivity to the communication device 101 and to provide registration and provisioning functions for the communication device 101. This typically involves the Initial Connectivity, Discovery and Registration, and MCIM Download and Provisioning Functions. Although the mediation server 103 is illustrated as a single node, the functions of the mediation server 103 may be separated into two or more nodes. The mediation server 103 is operated by the Registration Operator (RO), which is identified by the PCID and serves the communication device 101 to enable the communication device 101 to access to a 3GPP network in order to obtain the MCIM.

An account managing servers 104A to 104C are servers for managing the account information such as the MCIM. Although each of the account managing servers 104A to 104C is illustrated as a single node, the functions of the account managing server 104 may be separated into two or more nodes. The account managing server 104 is operated by the SHO.

An authentication servers 105A to 105C are servers for validating the credentials used to verify the communication device 101 as a trusted platform. The authentication server may also issue these credentials. Although each of the authentication servers 105A to 105C is illustrated as a single node, the functions of the authentication server 105 may be separated into two or more nodes. The authentication server 105 is operated by the Platform Validation Authority (PVA). The authentication server 105 supports the following:

Validation of platform credentials that assert the authenticity and integrity of the communication device 101 as a platform to hold the MCIM application and credentials;

Providing the DPF and SHO with information related to the success or failure of the validation of the communication device 101.

Obtaining new platform credentials when required, e.g., after a remote update of the communication device 101.

Figure 2A:
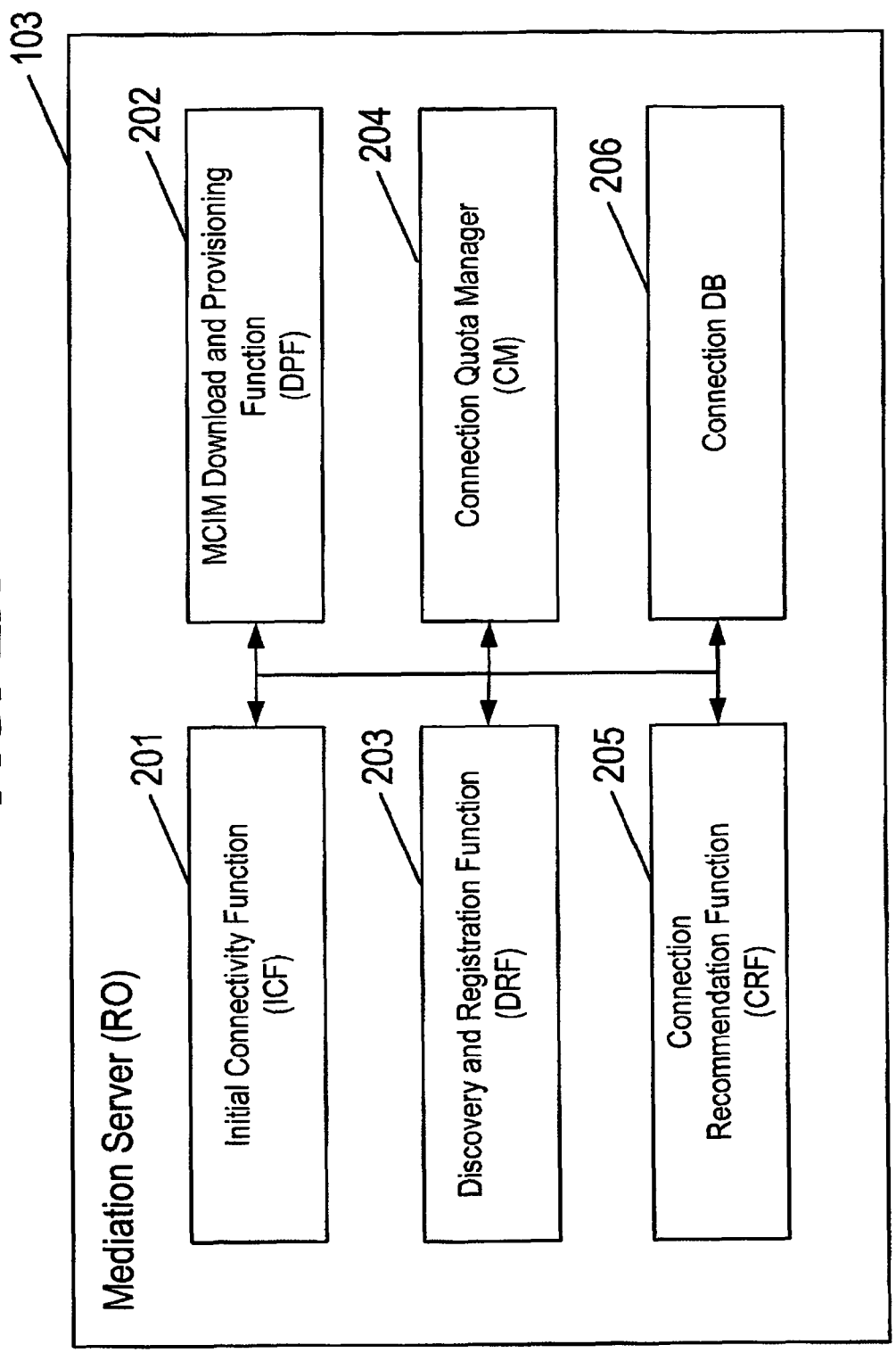
FIG. 2A is a functional block diagram of the mediation server 103.

FIG. 2A is a functional block diagram of the mediation server 103. The mediation server 103 comprises an initial connectivity function (ICF) 201, a MCIM download and provisioning function (DPF) 202, a discovery and registration function (DRF) 203, connection quota manager (CM) 204, a connection recommendation function (CRF) 205 and a connection DB 206. The detailed operations of each functional block in the mediation server 103 will be described later with reference to the sequence diagram of FIG. 4.

The ICF 201 provides connectivity services (at layers above the basic network access provided by the VNO) to help with the post-purchase discovery of the SHO. The ICF 201 provides IP connectivity for the communication device 101 to request downloading and provisioning of MCIM credentials and applications from a DPF via a Visited Network Operator (VNO) network.

The DPF 202 is a function for managing the downloading and provisioning of the MCIM applications and credentials to the communication device 101. In order to perform the secure provisioning of the MCIM applications and their parameters to the communication device 101, the DPF needs to support functions specified in 3GPP TR 33.812 V9.2.0.

The DRF 203 helps the communication device 101 to discover and register with any one of the account managing servers 104A to 104C. Address resolution is included within DRF 204.

The CM 204 acts as a queue management function. It uses factors influencing the speed of MCIM allocation, such as the load on each account managing server 104, i.e., how many communication devices are attached to each account managing server 104, to determine to which account managing server 104 a communication device 101 will be allocated. In a 3GPP standardized core network, this would be equivalent to knowledge about the load on the HSS. This information can be collected by the Operations and Management system of the Core Network, by a standardized system such as SNMP or OMA DM, or similar. The information is sent to the mediation server 103 either periodically or in real-time, for instance using the IMS Presence mechanism. In that case, an intermediary entity may be required to collect and filter the information before distributing it to the different mediation server 103.

When the communication device 101 sends an attach request to the mediation server 103, the CM 204 allocates the communication device 101 to the most appropriate account managing server 104. This may depend on which account managing server 104 is at the least loaded status. If the request for MCIM is to be sent to the least loaded account managing server 104, the CM 204 looks up the load, and stores the information about which account managing server 104 the communication device 101 was connected to in the Connection DB 206. The allocation is done based on the PCID of the communication device 101 and the load on the account managing server 104.

If the allocation is not done based on the load but some other factor, such that the mediation server 103 has a fixed number of MCIM allocated from each account managing server 104, the mechanism will be the same, except that the number of MCIM is used to determine which account managing server 104 is the most appropriate. More complex mechanisms can also be applied, such as calculations of price over capacity and the like.

If the communication device 101 has several installed MCIM, the mediation server 103 can facilitate the selection between them by assigning an appropriate account managing server 104. In cases where PCIDs indicating a priority are used during the attachment procedure, the CM 204 puts requests made using a higher priority PCID in front of requests made with a lower priority PCID in a request queue.

The CRF 205 is a recommendation function to provide a recommendation of the account managing server 104 which is the most likely to accept a request of issuance of the MCIM, in response to a query from the CM 204. The CRF 205 retrieves status information of each account managing server in the connection DB 206 and determines the most recommendable one for the communication device to obtain the MCIM immediately.

The connection DB 206 stores status information of respective account managing servers 104. The connection DB 206 may be a part of the mediation server or may be located on an external network and connected to the mediation server 103. An example of the data table stored in the connection DB 206 is illustrated in FIG. 3. Entries in the status information table shown in FIG. 3 include identification information (ID) 301 of each account managing server 104 and time information of T1 (302) and T2 (303). The ID 301 may include any kind of information which permits unique identification of the account managing server 104, for example, it may be an International Mobile Subscriber Identity (IMSI) of each account managing server 104. T1 (302) indicates a start time of request for issuance of the MCIM to the account managing server 104 operated by the SHO identified by the ID 301. T2 (302) indicates a reception time of the issued MCIM from the account managing server 104 operated by the SHO identified by the ID 301. A difference between the T2 and T1, that is T2-T1, indicates a response time period for issuing the MCIM by the account managing server 104 in response to the MCIM issuance request from the mediation server 103 to the account managing server 104. The difference can indicate an operation status, that is, the performance of the corresponding account managing server 104. Therefore, a bigger difference indicates lower performance and a smaller difference indicates higher performance.

Figure 4:
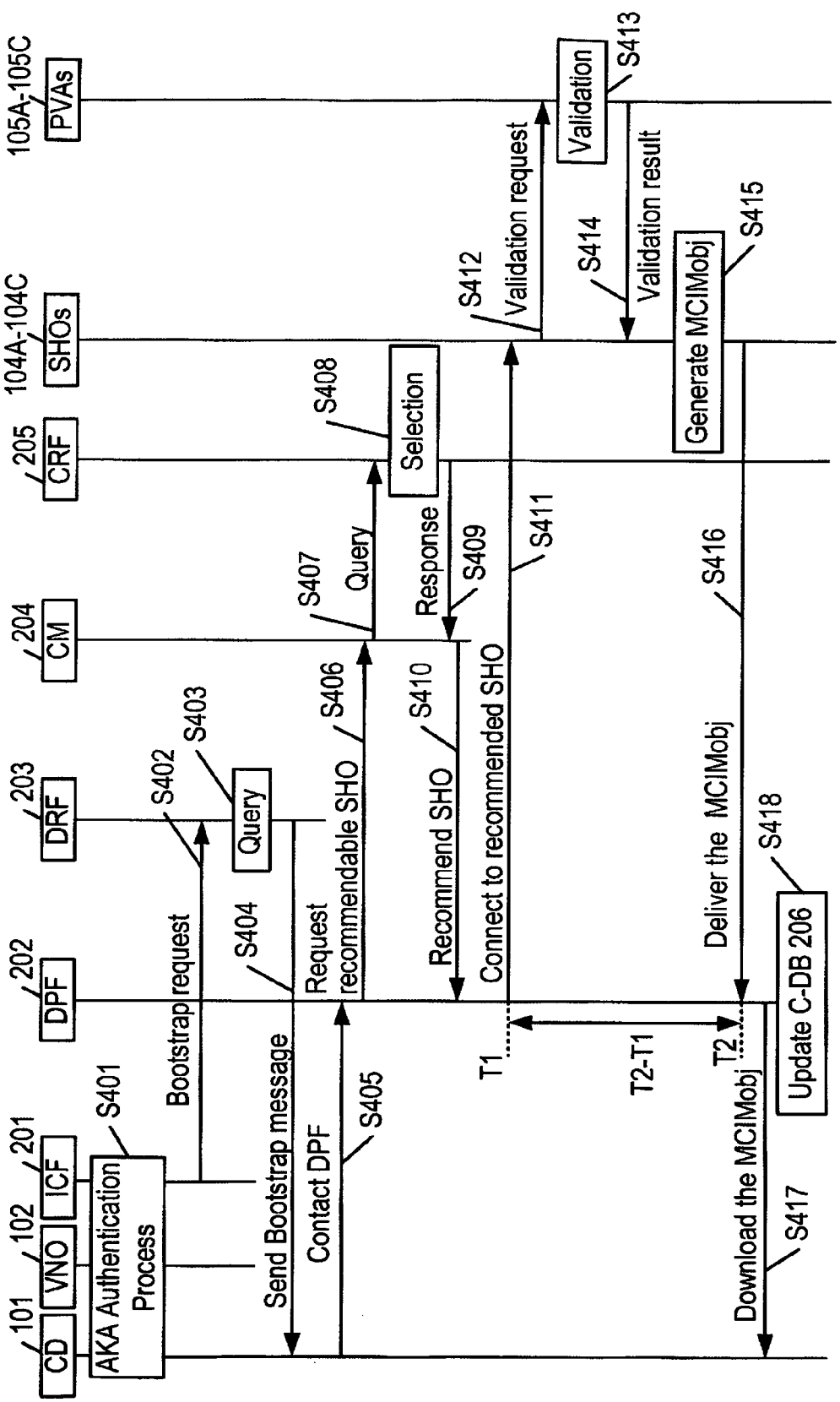
FIG. 4 is a sequence diagram illustrating an account provisioning procedure according to one aspect of embodiments of the present invention.

FIG. 4 is a sequence diagram illustrating an MCIM provisioning procedure according to an embodiment of the present invention.

In step S401, AKA authentication between the communication device and the ICF 201 in the mediation server 103 via the base station 102 is executed according to the process defined in the 3GPP TR33.812, V9.2.0. In step S402, the ICF 201 requests the DRF 203 to bootstrap. Internally, in the mediation server 103, the PCID and the IP address of the communication device 101 are forwarded from the ICF 201 to the DRF 203.

In step S403, according to the PCID-IMSI, the DRF 203 queries the address of the DPF 202 and the SHO in its database. Then the DRF 203 generates the Bootstrap message. In step S404, the DRF 203 sends the Bootstrap message to the communication device 101. In the message the DRF 203 includes the IP connectivity parameters (NAPDEF), the address of the DPF 202 (Server URL), the context of the MCIM application provision and the context of the M2M application provision. If the provided PCID-IMSI already points to the mediation server 103, the mediation server 103 can become the SHO, in which case, those accessing the mediation server 103 continue using the same IMSI.

In step S405, triggered by the Bootstrap message, the communication device 101 contacts the DPF 202 and includes relevant information of the communication device 101 and the TRE (e.g., platform validation info). In step 406, DPF 202 sends a request to the CM 204 for an account managing server 104 which is the most appropriate for issuing the MCIM as soon as possible for the communication device 101.

In step S407, the CM 204 queries the CRF 205 for information about which account managing server 104 is most likely to be able to accept the request under the current conditions. The CRF 205 selects one of the plurality of account managing servers 104 with reference to the connection DB 206. When the connection database stores time information of T1 (302) and T2 (303), the CRF calculates the differences between T2 and T2 for each account managing server 104 identified by the ID 301 and compares the calculated differences to find the one having the minimum value.

The account managing server 104 which has the minimum value can be considered the most appropriate server having a higher performance than the others for requesting the issuance of the MCIM for the communication device 101. In step S409, the CRF 205 sends a response to the query from the CM 204 with the address of the account managing server 104 which is selected as recommendable in S408. The account managing server 104 has a unique identifier, which can be based on the IMSI or other specific identifier including IP address or URI, and is stored in the connection database 206. In step S410, the CM 204 informs the recommendable account managing server 104 with its address to the DPF 202. In step S411, the DPF 202 connects to the recommended account managing server 104 using the address informed it by the CM, and relays the information of the communication device 101 and TRE there. In step S411, the DPF also records the time when it transmits the request to the account managing server 104 as T1 to be stored in the connection DB 206.

In step S412, the account managing server 104 sends the validation info signed by the PfC and TRE identity to a authentication server 105 associated with the account managing server 104 and requests the authentication server 105 to validate the authenticity and integrity of the TRE. In step S413, the authentication server 105 locally validates the authenticity and integrity of the communication device 101, according to the requirements of the account managing server 104.

In step S414, the authentication server 105 sends the validation results back to the account managing server 104, according to requirements from the account managing server 104. The account managing server 104 encrypts the MCIM by using the PfC and generates the management object for the communication device 101 (e.g., MCIMobj).

In step S416, the account managing server 104 delivers the encrypted MCIM (e.g., within MCIMobj) to the DPF 202 and authorizes provisioning of the MCIM application to the communication device 101. In S416, the DPF records the time when it receives the MCIMobj from the account managing server 104 as T2 to be stored in the connection DB 206.

In step S417, the DPF 202 downloads a MCIM object to the communication device 101 and the communication device 101 provisions the downloaded MCIM into the TRE. The TRE decrypts MCIMobj by using the TRE Platform Key to obtain the MCIM. The communication device 101 reports the success/failure status of the provisioning to the DPF 202. In step S418, the DPF 202 updates the connection DB 206 with the recorded time information T1 and T2.

In the above embodiment, the CRF 205 selects the account managing server 104 based on the current performance of each server determined using the response time. However, the embodiments of the present invention are not limited to this. For example, when the connection DB 206 stores the status information of each server regarding busy period 502, as shown in FIG. 5, the CRF 205 may select a server which is not in the busy state based on the contents in the connection DB 206. If there exist two or more account managing servers 104 which are not in the busy state, the CRF 205 may further consider the response time based on the difference of T2 and T1 also stored in the connection DB 206 as shown in FIG. 3 and the account managing server 104 having the minimum difference value may be selected.

It is furthermore possible to use any type of performance parameter which can be used to identify a server that having higher performance than others and to store such a performance parameter in the connection DB 206.

For example, using the SLA Management Handbook Volume 3, Service and Technology Examples, published from TeleManagement Forum, July 2004, the status information relating to the account managing servers 104 may include at least any one of service and server performance parameters and latencies or delays caused by the intermediary networks, such as performance specific parameters measured in ATM, SDH, Frame Relay, etc.; layer parameters; service operational parameters such as percentage of memory available, number of simultaneous processes, etc.; and Service/Technology Independent Parameters, such as percentage availability, Mean Time Between Failures (MTBF), Outage Intensity (OI), Mean Time to Provision Service (MTPS), and Mean Time to Restore Service (MTRS).

For further examples, according to the KPI in OMA Requirements Document ("Key Performance Indicator for OMA Enablers Requirements, Draft Version 1.0—22 Mar. 2010, Open Mobile Alliance, OMA-RD-KPIinOMA-V1_0-20100322-D"), performance indication parameters may be at least any one of measurement on sessions (e.g., parallel working session) of a service, respond delay for a service, and the traffic load for a service, if such information is available.

According to the above embodiment, when a mediation server 103, for instance acting in the role of a connectivity broker, has a number of communication devices 101 which need to connect to the network and hence need to be allocated with an MCIM, the invention will be useful. This scenario occurs, for example, when there are a large number of communication devices which connect for the first time, when the communication device need to refresh their MCIM at the same time, or when the communication device need to change the SHO (among the SHO which the RO has agreements with).

The first case will occur, for example, when a new housing development is switched on, and all the smart meters as the communication devices 101 in the houses connect for the first time. The second case will occur when the communication device has been inactive for a long time, for instance when they are intended to monitor an earthquake (in which case they will be inactive until an earthquake actually occurs). The third case will occur when the mediation server 103 (RO) sees a need to change the home operator for the communication device 101, perhaps because the contracts have expired.

This scenario assumes that the communication devices are attempting to connect and report data periodically, rather than constantly. Furthermore, it assumes that the reporting is not real-time, but can be performed in batches. This scenario assumes that the terminals can attach to one of several account managing servers (SHOs), which are responsible for the generation of the MCIM. The mediation server 103 then selects the most appropriate one for the communication device 101, based on several factors including the current load based on the processing time measured using T1 and T2 as shown in FIG. 3).

Whether the mediation server 103 can receive load data is a business decision on the part of the account managing server 104, and may be taken by the SHO organization, or outsourced to a hosting organization (e.g. when the SHO is running a network operated by a different party, such as a service organization).

Figure 6:
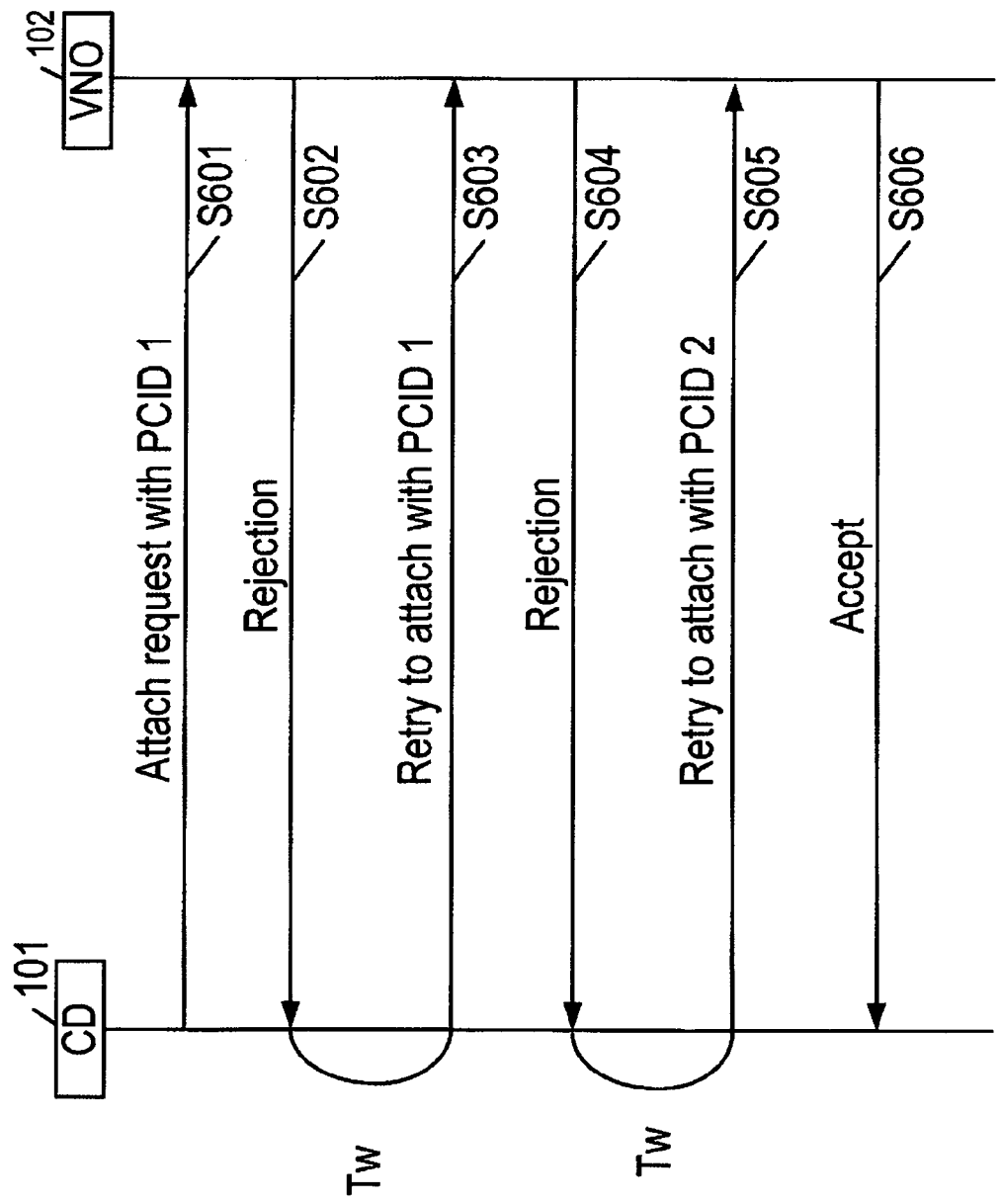
FIG. 6 is a sequence diagram illustrating an retry attempt by the communication device 101 to the base station 102 according to another aspect of embodiments of the present invention.

FIG. 6 is a sequence diagram illustrating a retry attempt by the communication device 101 to the base station 102 according to an embodiment of the present invention. The control unit 211 of the communication device 101 has a connection managing function for executing an exponential back-off algorithm in case of attachment failures. In FIG. 6, when an attach request from the communication device 101 to the base station 102 fails a predetermined number of times, for example twice in a case illustrated in FIG. 6, the communication device switches the PCID attached to the request.

Figure 7:
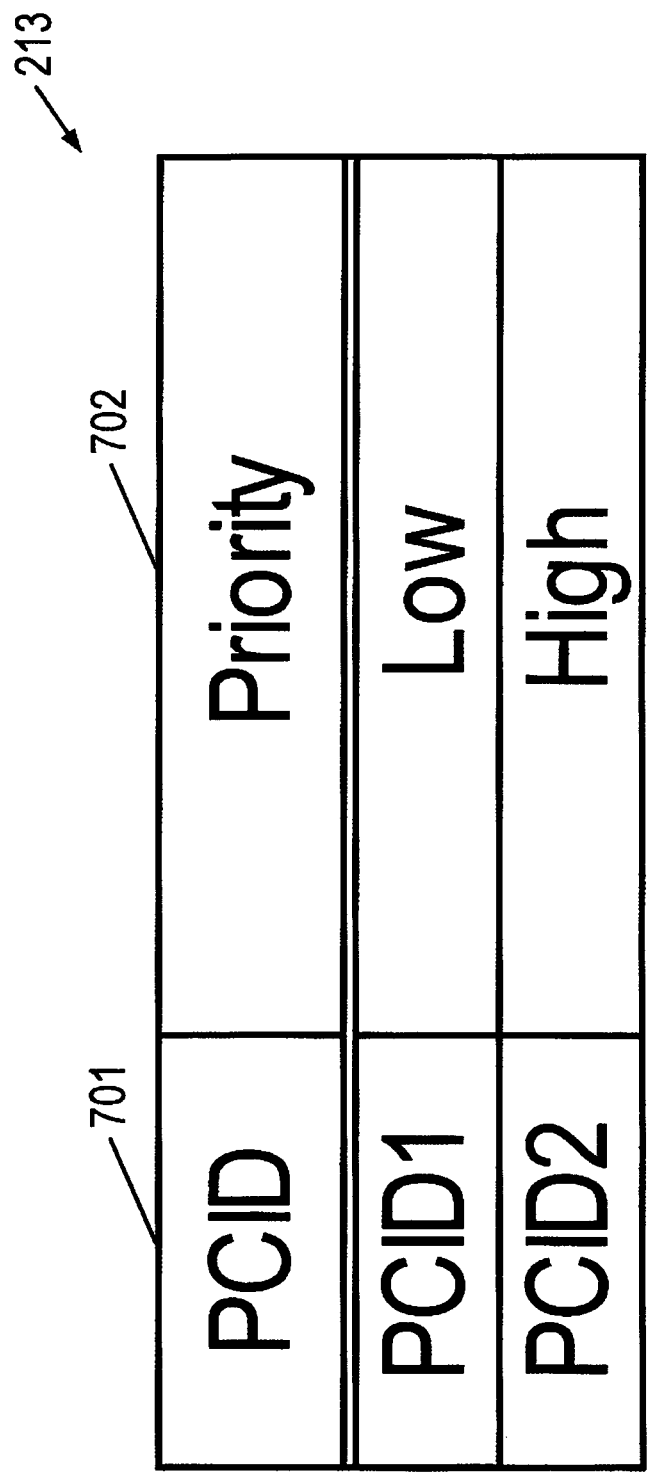
FIG. 7 is an example of data table stored in the PCID table 213 of the communication device 101.

FIG. 7 shows an example of the PCID table 213 in the communication device 101. In the case shown in FIG. 7, the PCID table stores two different PCIDs each having different priority. The PCID 1 has a lower priority and the PCID 2 has a higher priority. However, it should be noted that the number of the PCIDs which the communication device 101 can use may not be limited to two.

In step S601 and S603, the communication device 101 tries to attach to the base station 102 using the PCID 1 having the lower priority. If the attach request is successfully received by the base station, the process proceeds to step S401, as depicted in FIG. 4. However, if the attach request to the base station 102 using the PCID 1 fails twice and the communication device receives a rejection from the base station 102 in S604, after the rejection in S602, the communication device waits for a predetermined time period Tw and retries attaching to the base station 102 using the PCID 2 having the higher priority.

The base station 102 receives the attach request from the communication device 101 with the higher priority PCID, it accepts the attach request in S606. The base station 102 can identify the PCIDs with higher priority and since the mechanism for identifying these kinds of PCIDs by the base station 102 may be that commonly used in the technical art, a detailed description is omitted from this specification.

As a further embodiment of the present invention regarding procedures according to FIG. 4, only if the DPF 202 receives contact from the communication device 101 in S405 using the PCID having higher priority, does it send a request for the recommendation of the account managing server 104 to the CM 204 in step S406. The CM 204 maintains a request queue for requesting from a plurality of communication devices 101. If the CM 204 receives a request with a PCID having higher priority, the CM 204 prioritizes the request with the PCID of higher priority over other requests with PCIDs of lower priority included in the request queue, similar to a queue management system for QoS.

The embodiment relating to FIGS. 6 and 7 is useful in the following situation. For the communication device 101 which can report data either in batches or real-time, however, a mechanism is needed to overcome the limitation that a device may not be able to deliver data urgently, since all connection slots in the available network have been occupied by other devices reporting in batch. This is somewhat similar, but not equivalent, to the mechanism of emergency call establishment in GSM. However, the main difference here is that the data is urgent, but not an emergency—for instance, relating to an increase in traffic over a bridge, rather than the general statistics of the traffic, and not an emergency (the traffic is moving, there is just more of it).

Furthermore, some connection requests may be more urgent than others. For example a daily update of a power meter reading is less urgent than, e.g., a surge in automobile traffic at a bridge, tunnel or the like. In order to distinguish between more urgent and less urgent connections, if the communication device 101 has at least two PCIDs available each indicating a different priority class, depending upon the situation, one or the other PCID may be used when attaching to the network. The communication device 101 can be attached having used the low priority PCID when suddenly the necessity for an urgent update arises. To avoid the possibility of continuous rejection of the connection, the current MCIM can be detached from the network and a new connection can be requested with a PCID indicating a higher priority.

When there is a desire to prioritize allocating MCIM to some devices over others, the communication device 101 can have several PCIDs which can be divided into groups with different priorities. When there is an urgent need to connect, a separate PCID can be used by the communication device 101. It is possible to envision several PCID being allocated to terminals for establishment of connection at various levels of urgency.

The selection of the appropriate PCID would be managed by the connection managing function in the control unit 211 of the communication device 101, which hence would have to be aware of the urgency of the transmission. This, then, in turn assumes a certain level of preprocessing before the transmission in the communication device 101, which can be achieved by the device being equipped with some processing and memory, something it would need anyway to process data to be reported periodically.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A mediation server, comprising:
    a receiver for receiving a request, transmitted by a communication device, for issuing a downloadable subscriber identity module (SIM) to the communication device;
    a selection unit configured to select from a set of two or more account managing servers an account managing server to which the request from the communication device for the downloadable SIM is to be transmitted based on information stored in a database regarding a current operational status of each account managing server included in said set, wherein the selection unit is configured to perform the selection in response to the mediation server receiving the request for issuing the downloadable SIM transmitted by the communication device; and
    a transmission unit configured to transmit the request for issuing the downloadable SIM to the selected account managing server.

2. The mediation server according to claim 1, further comprising:
    an updating unit configured to update the information stored in the database regarding the current operational status of the selected account managing server based on a time period between the transmission of the request to the selected account managing server and reception of the downloadable SIM from the selected account managing server.

3. The mediation server according to claim 2, wherein the selection unit is further configured to select such an account managing server that has a time period between the transmission of the request to the selected account managing server and reception of the downloadable SIM from the account managing server that is shorter than those of other account managing servers.

4. The mediation server according to claim 1, wherein the database manages information regarding busy time period for each account managing server, and
    the selection unit is further configured to select such an account managing server that does not have a busy status at the time of selection based on the stored information in the connection database.

5. The mediation server according to claim 1, wherein the information regarding the current operational status includes one or more types of performance parameters respectively indicating a current performance of one of the account managing servers, and
    the selection unit is further configured to select such an account managing server that has higher performance than other account managing server based on comparison of values of the performance parameters.

6. The mediation server according to claim 1, wherein a communication device issues the request using one of at least two items of identification information of the communication device, each having different priority, and
    the mediation server further comprising:
    a queue management unit configured to receive requests from the communication devices and to transfer the requests to the selection unit by managing a queue of requests based on the identification information attached to each request, wherein the queue management unit is further configured to transfer the request with the identification information of higher priority, prior to the request with the identification information of lower priority in the queue.

7. The mediation server of claim 1, wherein the request for issuing a downloadable SIM indicates an identification of the communication device, and wherein the information regarding the current operational status of each account managing server identifies a load of each of the account managing servers, and wherein the selection unit is configured to select which of the account managing servers to transmit the request based on the identification of the communication device and the load of each of the account managing servers.

8. The mediation server of claim 1, wherein the information regarding the current operational status of one of the account managing servers includes at least one of percentage of memory available at the account managing server and number of simultaneous processes on the account managing server, and the selection unit is configured to select which of the account managing servers to transmit the request based on the information.

9. The mediation server of claim 1, wherein the information regarding the current operational status of one of the account managing servers includes at least one of mean time between failures (MTBF), output intensity, mean time to provision service (MTPS), and mean time to restore service (MTRS).

10. The mediation server of claim 1, wherein the request received by the mediation server indicates an identification of the communication device that transmitted the request, and wherein the transmission unit is configured to transmit the request to an account managing server only if the identification of the communication device is associated with a priority level that is higher than a predetermined threshold.

11. The mediation server of claim 10, wherein the mediation server is configured to place the request in a queue of requests for issuing downloadable SIM, and wherein the placement of the request within the queue is based on the priority level associated with the identification of the communication device.

12. The mediation service of claim 1, wherein the downloadable SIM comprises information needed by the communication device to obtain a communication service.

13. A communication system comprising:
    a plurality of account managing servers; and
    a mediation server which is able to communicate with each of said plurality of account managing sewers, wherein
    the mediation server comprises:
    (i) a receiver for receiving a request for issuing a downloadable subscriber identity module (SIM) transmitted by a communication device;
    (ii) a selection unit configured such that, in response to the mediation server receiving the request for issuing the download able SIM transmitted by the communication device, the selection unit selects from the plurality of account managing servers an account managing server to which the request is to be transmitted based on information stored in a database regarding a current operational status of each account managing server included in said plurality; and (ii) a transmission unit configured to transmit the request for issuing the downloadable SIM to the selected account managing server, the selected account managing server is configured to transmit the downloadable SIM to the mediation server in response to receiving the request from the mediation server, and the mediation server is configured to forward the downloadable SIM to the communication device.

14. The communication system of claim 13, wherein the downloadable SIM comprises information needed by the communication device to obtain a communication service.

15. A method performed by a mediation server, the method comprising:

the mediation server receiving from a communication device a request for issuing a downloadable subscriber identity module (SIM);

the mediation server, in response to receiving the request, selecting from a set of two or more account managing servers an account managing server to which the request is to be transmitted, wherein the selection of the account managing server is based on information stored in a database regarding a current operational status of each account managing server included in said set of account managing servers; and the mediation server transmitting the request for issuing the downloadable SIM to the selected account managing server.

16. The method of claim 15, wherein the downloadable SIM comprises information needed by the communication device to obtain a communication service.

17. A computer program product comprising a non-transitory computer readable medium storing a computer program which, when executed by a computer, causes the computer to perform the steps of:

selecting from a set of two or more account managing servers an account managing server, wherein the selection of the account managing server is based on information stored in a database regarding a current operational status of each account managing server included in said set of account managing servers, wherein the selecting step is performed in response to the computer receiving from a communication device a request for issuing a downloadable subscriber identity module (SIM); and transmitting the request for issuing the downloadable SIM to the selected account managing server.

* * * * *